(12) United States Patent
Smith

(10) Patent No.: US 6,594,724 B1
(45) Date of Patent: Jul. 15, 2003

(54) ENHANCED DASD WITH SMALLER SUPPLEMENTARY DASD

(75) Inventor: Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/539,155

(22) Filed: Mar. 30, 2000

(51) Int. Cl.[7] .............................................. G06F 12/00
(52) U.S. Cl. ....................... 711/112; 711/100; 711/113; 711/114
(58) Field of Search ....................... 711/100, 3, 111, 711/112, 113, 114, 115, 154

(56) References Cited

U.S. PATENT DOCUMENTS

| | | | |
|---|---|---|---|
| 3,864,750 A | | 2/1975 | Applequist ................. 360/105 |
| 4,371,929 A | * | 2/1983 | Brann et al. ................. 710/45 |
| 4,908,793 A | | 3/1990 | Yamagata et al. ............ 365/52 |
| 5,155,845 A | * | 10/1992 | Beal et al. ..................... 714/6 |
| 5,243,479 A | | 9/1993 | Nakagoshi et al. ...... 360/98.01 |
| 5,264,975 A | | 11/1993 | Bajorek et al. .......... 360/97.01 |
| 5,392,244 A | * | 2/1995 | Jacobson et al. ........... 711/114 |
| 5,398,158 A | | 3/1995 | Fisher et al. ................ 361/685 |
| 5,422,767 A | | 6/1995 | Hatchett et al. ......... 360/98.01 |
| 5,457,796 A | * | 10/1995 | Thompson ................. 707/203 |
| 5,603,062 A | * | 2/1997 | Sato et al. .................... 710/62 |
| 5,613,088 A | * | 3/1997 | Achiwa et al. ............. 711/155 |
| 5,754,756 A | * | 5/1998 | Watanabe et al. ............... 714/6 |
| 5,845,319 A | * | 12/1998 | Yorimitsu ................... 711/114 |
| 5,960,169 A | * | 9/1999 | Styczinski ................... 711/114 |
| 5,960,451 A | * | 9/1999 | Voigt et al. ................. 711/114 |
| 6,070,226 A | * | 5/2000 | Freeman et al. ............ 711/117 |
| 6,112,255 A | * | 8/2000 | Dunn et al. .................... 710/7 |
| 6,182,198 B1 | * | 1/2001 | Hubis et al. ................ 711/162 |
| 6,223,269 B1 | * | 4/2001 | Blumenau ................... 711/202 |
| 6,230,240 B1 | * | 5/2001 | Shrader et al. ............. 711/114 |
| 6,304,942 B1 | * | 10/2001 | DeKoning .................. 711/114 |

FOREIGN PATENT DOCUMENTS

| | | |
|---|---|---|
| JP | 4-139684 A | 5/1992 |
| JP | 4-291079 A | 10/1992 |
| JP | 5325496 | 10/1993 |
| JP | 6-20460 A | 1/1994 |
| JP | 06084338 A | 3/1994 |
| JP | 11195282 | 7/1999 |

* cited by examiner

Primary Examiner—Tuan V. Thai
(74) Attorney, Agent, or Firm—Baker & Maxham; James R. Nock

(57) ABSTRACT

A digital access storage device comprises a first disk drive, at second disk drive smaller than the first disk drive, the drives are physically mounted on a common chassis, and an electronic control system interconnecting said first and second disk drives. In a preferred embodiment, the storage device has a system interface and the electronic control system is structured to transfer data between the device interface, the first disk drive, and the second disk drive using the first drive's internal data paths and processor speeds, electronic control system comprises a shared system control processor is structured to provide overall control of the first and second disk drives.

51 Claims, 4 Drawing Sheets

ENHANCED DASD WITH SMALLER SUPPLEMENTARY DASD

BACKGROUND OF THE INVENTION

1. Field of the Invention

The present invention relates generally to a main direct access storage device (DASD) and pertains particularly to a novel arrangement of a DASD interconnected via an electronic control system to an embedded smaller sized supplementary DASD in order to enhance performance, functionality, efficiency, and reliability.

2. Discussion of the Related Art

One of the principle components of a computer system is a memory device or other place to store data. Typically computer systems employ a number of storage means for storing and retrieving data used by the computer. For example, a computer system can store data in a peripheral storage device referred to as a disk drive or direct access storage device (DASD).

Generally, a DASD comprises at least one rotating disk covered with a magnetic coating which can store magnetic or electronic data; or a disk including an optically encoded medium; and an apparatus for reading data from and writing data to that disk. Typically, the apparatus for reading and writing data includes a "spindle motor" to rotate the disk, at least one "read/write head" to read and write data to and from the disk, an "actuator" to position the read/write head or heads radially over the disk, and a "data channel" to transfer information between the read/write head or heads and an accessing source. An electronic system controls the rotating disk, spindle, heads, and transfer of information to and from the disk and the rest of the computer system. Finally, a computer interface, for example, the standardized Small Computer Synchronous Interface (SCSI), is used to interface the DASD with the rest of the computer.

Today's technology relating to data storage and DASDs is marked by continuing trends towards standardization and towards increased storage capacity, increased read and write speeds, reduced data storage device weight and size, and reduced power consumption. Standardization in size, referred to as form factor, and in interface compatibility is being pursued by manufacturers of both desktop systems such as personal computer (PC) and workstation systems and larger computing systems. Thus, DASDs from several different manufacturers, having differing capabilities and capacities, but with standard form factors and plug-in configurations may be used interchangeably in different PC's, for example, in standardized plug-in slots provided by the PC manufacturers.

These plug-in configurations have lead to electronic system designs employing multiple DASDs to increase storage capacity, reliability, and data throughput. For example, data throughput has been increased by reducing the time required to record or reproduce data (access time) by organizing multiple DASDs in a redundant array of independent disks or RAID array. A controller accesses stripes of parallel data across the multiple disks in the array to achieve higher data transfer rates by filling the data gap that results when one DASD is unavailable for reading data, or is seeking a new data segment, with a stripe of data from another DASD.

Various techniques such as those in U.S. Pat. No. 5,398, 158, Japanese Patent No. JP 5325496, and JP 06084338A have been proposed in order to implement redundant array of independent disks (RAID) technology. However, these proposals teach an array of similar sized disks, each mounted separately and connected only through external interface cables to a central disk or controller. Thus, as further explained below, these configurations are less efficient, have slower data throughput, have inferior error logging, and require more space than the present invention because they involve multiple similar type disks mounted separately and connected via external interfaces. Another proposal, U.S. Pat. No. 5,422,767, assigned to the assignee hereof, offers multiple independent disks mounted on a base having a vibration damper. Again, this set up will not be as efficient, quick, or small as the current device because it also teaches multiple similar type disks mounted separately and connected via external interfaces.

However, these prior systems are hampered by the use of multiple independent disk drive units which do not fit within the form factor of a single drive. Further, these systems are complicated because each independent drive has its own control circuitry and is connected through a standard interface to a separate controller or controlling disk drive. Additionally, these systems suffer from a limited capacity semiconductor or chip based volatile cache memory which looses its data (volatile) every time it is cleared, written over, powered down, or fails. Finally, because the error log for each DASDs is kept on the disk itself, the log is limited in detail and often unrecoverable (volatile).

Therefore, there exists a need for a DASD that has increased non-volatile cache memory, extensive non-volatile error logging capacity, increased parallel data access, increased data throughput during RAID operation, and read/write capability prior to main disk spin up; and that fits within a standard disk drive form factor.

SUMMARY AND OBJECTS OF THE INVENTION

It is a primary object of the present invention to provide an improved DASD that has increased non-volatile cache memory, extensive non-volatile error logging capacity, increased parallel data access, increased data throughput during RAID operation, and read/write capability prior to main disk spin up; and that fits within a standard disk drive form factor The present invention solves the problem of DASD limited and volatile caches; limited and volatile error logs; lack of parallel data access; lack of data transfer prior to DASD spin-up; and inefficient operation during RAID operations. Broadly, the present invention provides an enhanced and superior DASD with increased performance, functionality, efficiency, and reliability.

In accordance with a primary aspect of the present invention, a digital access storage device has a main first disk drive, at least one second smaller disk drive, and an electronic control system interconnecting the disk drives. In a preferred embodiment, the first and second disk drives may be physically mounted on a common chassis.

However, the claims alone—not the preceding summary—define the invention.

BRIEF DESCRIPTION OF THE DRAWINGS

The nature, goals, and advantages of the invention will become more apparent to those skilled in the art after considering the following detailed description when read in connection with the accompanying drawing in which like reference numerals identify like elements throughout, wherein.

DETAILED DESCRIPTION OF THE PREFERRED EMBODIMENTS

General

Figure 1:
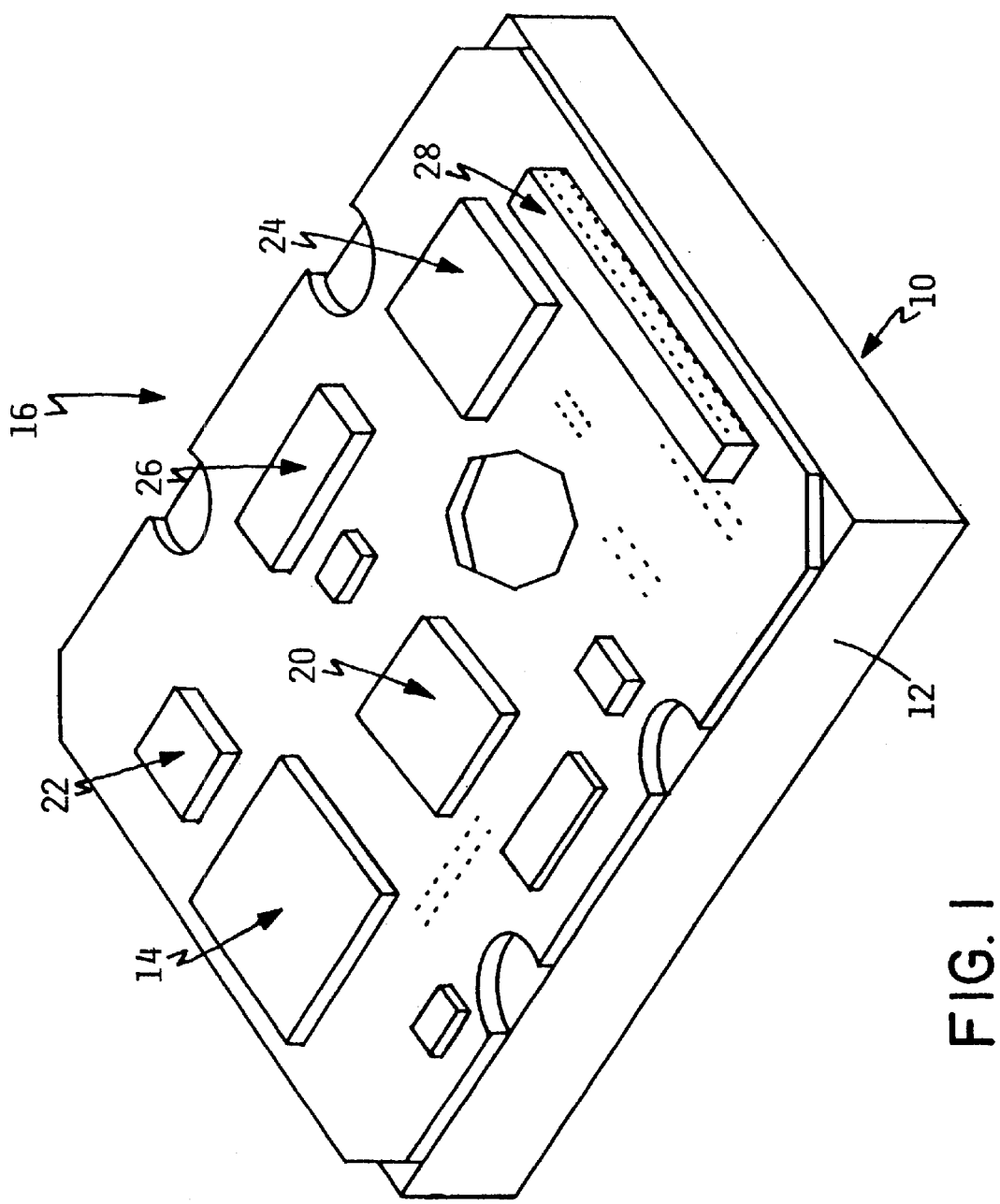
FIG. 1 is a perspective view of a preferred embodiment of the enhanced DASD showing a second microdrive embedded into a main first DASD and the interconnecting electronic control system components.

As shown in the drawings for purposes of illustration, an enhanced digital access storage device (DASD) according to the invention comprising an interconnected main first DASD and at least a second smaller microdrive. A DASD according to the invention provides increased performance, functionality, efficiency, and reliability by embedding and interconnecting via an electronic control system, a second, smaller sized supplementary DASD into a main first larger DASD. Specifically, the invention enhances current DASD designs by adding increased and non-volatile cache memory, increased and non-volatile error log capacity, increased parallel data access, increased data throughput during RAID operation, transfer of data prior to main disk spin up; and by conforming to a standard DASD form factor. "Smaller" herein refers to the physical size of the DASD or disk drive units, therefore, a smaller DASD (or microdrive) must have a size smaller than that of the mark DASD it is compared to. Also, although, a larger DASD generally has more data storage capacity, it is possible for the present invention to include a main larger first DASD and a second smaller microdrive, each having the same amount of data storage capacity. Further, although herein the main first DASD is occasionally referenced as a standard 3.5-inch drive and the second smaller drive is referenced as a microdrive, the size of the drives is likely to shrink in the future.

Figure 2:
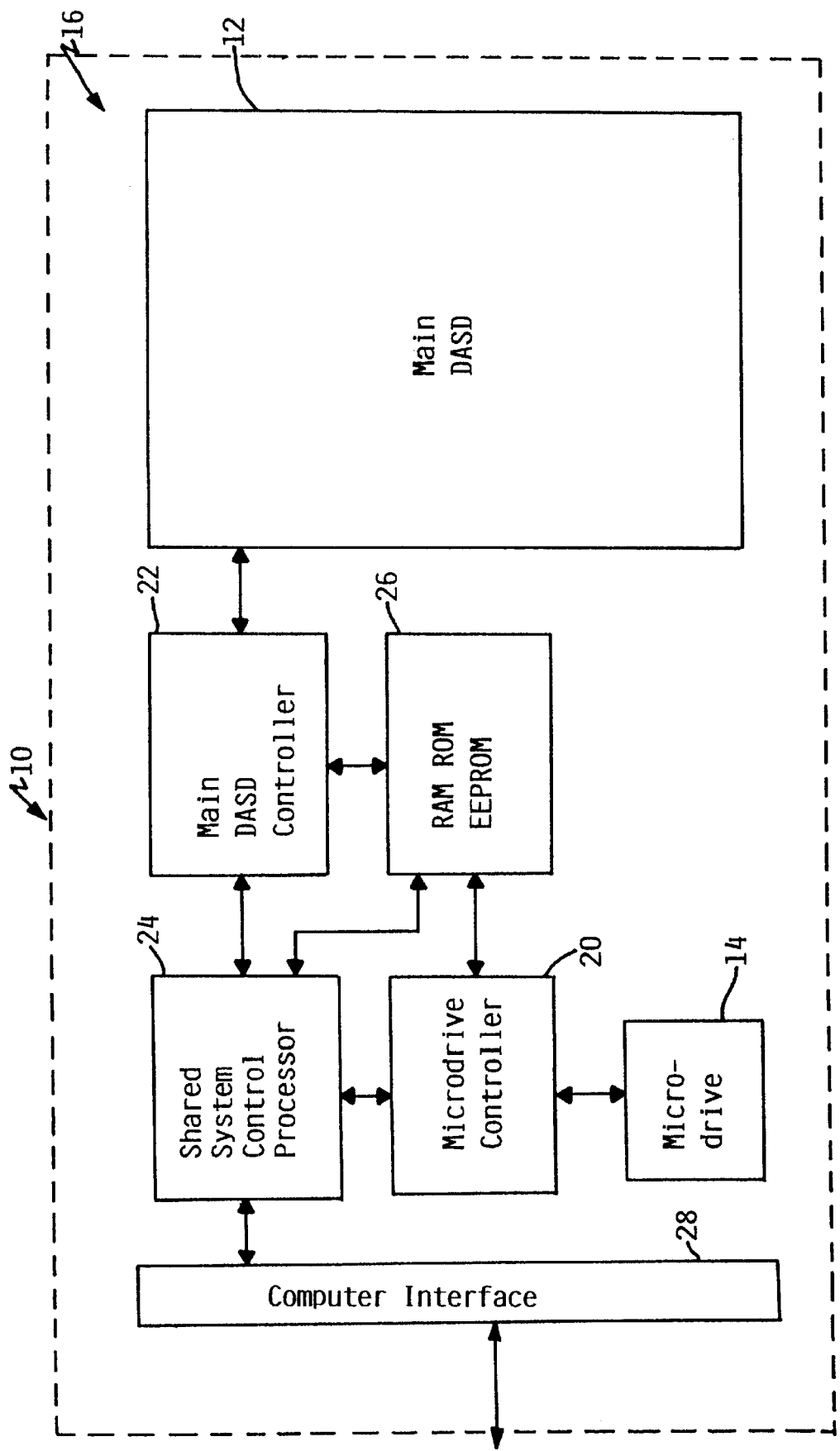
FIG. 2 is a conceptual block diagram illustrating the enhanced DASD in FIG. 1.
Figure 3:
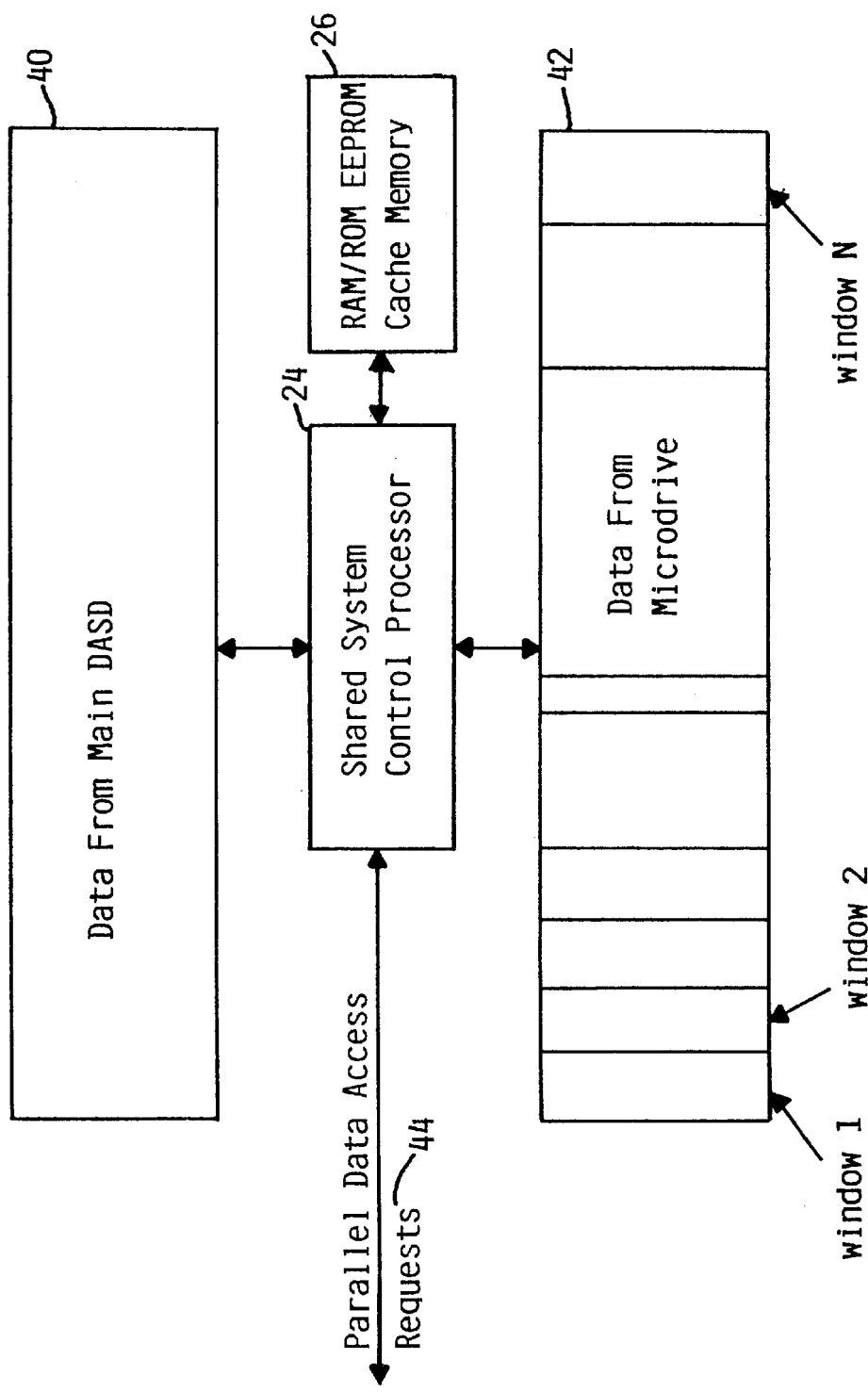
FIG. 3 is a diagram of a multiple data stream example for the enhanced DASD.

Referring to FIGS. 1, 2 and 3 of the drawings, an exemplary embodiment of the enhanced DASD and method of making the same is illustrated. Particularly, in FIG. 1, the enhanced DASD in accordance with one embodiment of the invention is illustrated and designated generally by the numeral 10. It includes a main relatively larger DASD 12, a second smaller microdrive 14, and an electronic control system 16. In the embodiment shown, the electronic control system comprises an independent controller for the main DASD 20, an independent controller for the microdrive DASD 22, a shared system control processor 24, a RAM/ROM EEPROM cache memory buffer 26, and an external computer interface 28. While the specific embodiment of the interconnecting electronic control system 16, shown in FIG. 1, 2, and 3, is described with a shared system control processor 24, and RAM/ROM EEPROM cache memory buffer 26, other embodiments or examples may contain different arrangements.

In the illustrated embodiment the microdrive 14 mounts physically or "piggyback" onto and is embedded into the functionality of the main DASD 12 in order to create the enhanced DASD 10. As shown, a microdrive can be mounted above the casting or casing of a main larger DASD, and on the end opposite the electronic control system card. In fact, depending on the size of the electronic card of the main DASD and whether mounting of the microdrive is onto or beside the card, it is possible to have a number of microdrives cooperating together to enhance performance of the main DASD. For example, two microdrives can be mounted side-by-side on a 3.5" form factor DASD casing surface opposite the end containing the electronics card. Moreover, mounting three or more supplementary microdrives 14 upon a main DASD 12 opens up possibilities for higher redundant array configurations and other improvements of redundancy, functionality, and fault tolerance.

The enhanced DASD 10 also requires less physical space and less power than a similar number of main sized DASDs connected to a central DASD or controller. Further, the enhanced DASD can transfer data using internal DASD data paths and processor speeds, as opposed to through external interfaces, such as SCSI or Fibre Channel, which is how current multi DASD systems transfer data.

Another improvement of the enhanced DASD is a reduction in the number of power cables, number of data paths, amount of circuitry, and amount of power required. For example, a main DASD 12 having one or more supplementary microdrives DASDs 14 can be manufactured into an enhanced DASD 10 having only a single electronic circuit board, a single power cable, and a single data cable. Such component sharing reduces the amount of electronics required and power consumed for multiple DASD configurations making the enhanced DASD more efficient, more reliable, quicker to respond, and give increased data throughput.

The enhanced DASD is simple and easily fabricated and may include a microdrive 14 that is socket or plug mounted onto the main DASD 14 chassis or electronics card so that the microdrive is removable. As used herein "removable" means that components can be separated from each other without unreasonable effort and without damaging the components. Where desirable a physical unit containing the microdrive 14 and the microdrive controller 22 that can be removably mounted into a socket on the larger main DASD 12. This configuration benefits by allowing an "off the shelf" microdrive, to be plugged into a larger standard sized disk drive having modified electronics and a microdrive mounting socket.

Examples of removably mounting one or more microdrives to a motherboard or other suitable substrate are disclosed in IBM Technical Disclosure Bulletin Vol. 32, No. 10B dated March 1990, which is incorporated herein by reference as though fully set forth. Another example of plug or removably mounting disc drives to an electronic substrate is disclosed in U.S. Pat. No. 5,264,975 dated Nov. 23, 1993 entitled "Magnetic disk storage device with the base provided by an electronic module substrate", assigned to the assignee hereof and incorporated herein as though fully set forth.

Referring to FIGS. 1, 2, and 3 for illustration, a microdrive 14 with its own compact flash microdrive controller 22 and microdrive interface, could be mounted into a socket on a larger unit comprising a main DASD 12, a main DASD controller 22, an electronic control system 16, a shared system control processor 24, and a RAM/ROM EEPROM cache 26. Once interconnected, the microdrive could be used as an embedded memory component of the main DASD. One advantage of this configuration is that if either the microdrive unit (including the microdrive 14) or the larger unit (including the main DASD 12) fail, the other, still functional unit can be removed and combined with the same type of unit that failed in order to quickly recover data that was on the good unit's disk drive at the time of the failure. This information might be critical data, a computer program (possibly containing a "bug" or virus that caused the failure), or the error log of the failed unit or disk drive. Further examples and uses of this data will be described below.

Other constructions of the invention include mounting a microdrive onto a main DASD having a standard form factor, or mounting both drives onto a standard form chassis in order to construct an enhanced DASD that fits into a standard DASD form factor slot. This permits, the enhanced DASD to be installed as part of a new electronics or computer system, as well as as a replacement or upgrade DASD to an existing system. For instance, an enhanced DASD comprising an "off the shelf" microdrive (4.28× 3.36×0.5 cm, 340 Megabytes) physically mounted onto and embedded into the electronics architecture and functionality of a standard form 3.5" DASD can be manufactured so that when completed, it will fit into a standard form 3.5" DASD slot.

As shown in FIG. 2, the device may be configured so that both the main DASD and microdrive are controlled by independent controllers which are in turn controlled by a shared system control processor 24, and are connected to a shared EEPROM cache memory 26. Here, the computer interface 28 is connected to the shared system control processor 24 which is connected to the main DASD controller 22, the microdrive controller 20, and the RAM/ROM EEPROM cache memory buffer 26. In turn, the main DASD controller 22 is linked to the main DASD 12, and to the RAMIROM EEPROM cache memory 26. Likewise, the microdrive controller 20 is linked to the microdrive 14, and to the RAM/ROM EEPROM cache memory 26. This embodiment allows the shared system control processor 24 access to all the data on both drives through their independent controllers, as well as access to the semiconductor or chip based EEPROM cache in order to provide overall control of the data flow between the computer interface 28, the RAM/ROM EEPROM cache memory 26, the main DASD 12, and microdrive 14.

Similarly, the shared system control processor 24 may provide overall control of the microdrive and main DASD transducer reading, writing, and seeking, and other mechanics and data transactions through the independent microdrive controller 22 and the main DASD controller 20. Alternatively, the invention may have no independent main DASD controller 20 and no microdrive controller 22. In this embodiment, the shared system control processor 24 contains all the circuitry necessary to control all data flow and DASD mechanics and data transactions for both drives. For instance, the microdrive 14 may have all of its control circuitry imbedded within the electronics control or circuit card of the main DASD 12. In all of the configurations above arbitration and bus overloading is omitted because data transfer and disk drive control is performed by the shared system control processor 24 using the internal data paths and processor speeds of the main DASD.

Moreover, the electronics functionality of the microdrive 14 can be embedded into the electronics functionality of the main DASD 12 to perform specific functions that increase the performance, functionality, efficiency, and reliability of the enhanced DASD. To begin with, as an embedded memory component, the microdrive 14 inherently increases the storage capacity of the main DASD 12. Most notably, however, the microdrive's functionality can be used by the enhanced DASD to provide increased non-volatile cache memory, increased non-volatile error log capacity, increased parallel data access, increase data throughput during RAID operation, and to allow access to "read" and "write" data prior to main disk spin up.

First, the enhanced DASD can be configured to have increased and non-volatile cache memory capacity by using the microdrive as a cache memory device. The enhanced DASD has substantially more cache memory capacity than a standard DASD with only a RAM/ROM EEPROM or other chip type cache, because the microdrive 14 has hundreds times more data capacity than a standard DASD's chip type cache memory. Therefore, while it is not possible for a microdrive to equal the input and output performance speed of a semiconductor-based ("chip") memory cache, the microdrive is certainly more cost effective for larger cache capacity requirements. Of particular value is the use of the microdrive 14 as a second-level read and write cache for the main DASD 12.

As a "write cache" or a cache for data from the computer interface 28 to be written to the main DASD 12, the microdrive 14 can continue to receive additional "write data" even after the main DASD's RAM/ROM EEPROM 26 or other chip-based cache memory is full. Similarly, the microdrive 14 can be used to store additional "write data" when the main DASD 12 is unavailable or in the process of spin-up. The microdrive 14 retains the "write data" until the main DASD is available. Then the "write data" is transferred from the microdrive 14 and rewritten on the main DASD 12 as time permits, as opposed to being lost as it would be if only the chip cache were available. Thus, as a "write cache" the microdrive 14 adds capacity and functionality to the enhanced DASD.

Similarly, as a "read cache" or a cache for data read from the main DASD 12 to be provided to the computer interface 28, the microdrive 14 can retain commonly requested "read data" that can be sent to the interface, without or prior to spin-up of the main DASD 12 or while the main DASD is reading or writing other data. Additionally, by storing much more data than a chip based cache memory 26, the enhanced DASD requires less frequent spin-up and access to the slower less efficient larger main DASD than a larger DASD equipped with only semiconductor-based cache. Therefore, the enhanced DASD is more energy efficient and has increased performance and reliability because the microdrive 14 affords a dramatic increase in the speed of access to and amount of cache "read data" and "write data".

Also, the microdrive 14 provides non-volatile cache memory because unlike a cache chip, the microdrive will continue to store the cache data as electromagnetic media even if the main DASD's cache memory 26 is cleared, powered down, or fails. For instance, a shared system control processor 24 can be set up to enhance a standard 3.5" DASD's existing chip based cache memory capability by incorporating a microdrive 14 as a second-level non-volatile read and write memory cache with increased capacity. Alternatively, it is possible to use the microdrive 14, as the only cache memory component, without using a chip based cache 26.

Second, the enhanced DASD can be constructed to have increased and non-volatile error logging capacity by using the microdrive 14 and main DASD 12 as error logging devices. An error log operates as a kind of "black box" recorder (like the flight data recorders airlines use) to keep a copy of disk errors. The error logs are currently not recoverable in about 10–20% of field return DASDs due to catastrophic failures. Some of these types of failures are motor failures, heads stuck on disks, head failures, arm electronics failures, and head crashes. By keeping a copy of the microdrive's error log on the main DASD and vice versa, it is possible for the enhanced DASD to have a copy of both error logs on each disk, thereby making the error logs non-volatile. If one of the disk drives experiences a catastrophic failure and its error log is not recoverable, a copy of that error log can simply be downloaded from the other disk drive. Furthermore, for higher redundant disk or RAID configurations involving multiple microdrives per main DASD, the interconnecting electronic control system 16 allows for non-volatile copies of all the DASD error logs to be kept on each disk.

Additionally, the enhanced DASD will have substantially more error log capacity for the main DASD and microdrive than a standard DASD drive, where the log is kept on that single DASD disk. This is because the combination of the main DASD 12 and microdrive 14 provides a much greater overall data capacity, which permits for main DASD error logs to be kept for both the main DASD and microdrive. Therefore, a more detailed record of the main disk drive's errors can be kept by the enhanced DASD than that of a current DASD.

Third, the enhanced DASD can be built to have increased parallel data access capability by using the microdrive 14 as a playback buffer. In a multimedia server environment, high data throughput is required. In addition, the ability to freeze frame and more importantly, fast forward and rewind video data is important. In this environment, for instance, the microdrive 14 increases performance by providing buffer capacity for video and audio streams from the main DASD 12 during playback, allowing for higher throughput of multimedia data. Further, as a data buffer, the microdrive 14 can be used to hold video windows allowing for fast forward and rewind of video streams for multiple users.

FIG. 3 is a diagram of a multi data stream example, showing data 40 from the main DASD and data 42 from the microdrive being accessed by the shared system control processor 24 and RAM/ROM EEPROM cache 26 in order to fulfill parallel data access requests 44. Here, the microdrive 14 is updated with various length segments of different streams of video data, and places these streams into "windows" or "partitions". Thus, it is possible for the shared system control processor 24 to access these "windows" or "partitions" of data, numbered as window 1–window N, in FIG. 4, as data 42 from the microdrive. Then, when a request to rewind or fast forward is received by the shared system control processor 24, it is serviced by accessing the requested "window" of data 42 from the microdrive. Using data 42 from the microdrive to fulfill the request is beneficial because it does not interrupt the data stream 40 from the main DASD, and hence minimizes impact on other video users.

Referring to FIG. 3, in a particular embodiment, the microdrive 14, could be a microdrive containing thirty (30) widows of data (N=30) where each of the thirty (30) windows is a widow of multimedia data (audio and/or video) spanning 1 minute, for thirty (30) different users. Consequently, if a particular user sends a request 44 to fast forward or rewind video, up to thirty (30) seconds of forward or reverse data can be retrieved by the shared system control processor 24, from the microdrive data 42, without interrupting the main DASD's playback for the other twenty-nine (29) users. If multiple users request fast forward or rewind operations, such requests 44 are queued by the shared system control processor 24, and retrieval is balanced between data from the main DASD 40 and data 42 from the microdrive. As a reference, note that 30 minutes of compressed MPEG video data takes about 300 Megabytes of storage, and it is therefore economically impractical to store this amount in chip based memory.

Fourth, the enhanced DASD can be created to function as a superior redundant array of independent disks or "RAID" system since unlike other RAID configurations, it incorporates an interconnected microdrive 14. In the industry, RAID systems are used to increase data throughput by reducing access time when multiple DASDs are accessed through a single control DASD or data buffer. For instance, in a RAID-1 system, data is mirrored on two different DASDs to ensure that it is non-volatile as long as the two DASDs are functional. Then, if one of the DASDs fail, a copy of the data still exists on the other DASD, and is now volatile until the failed DASD or part can be replaced. This parallel access capability significantly increases data throughput for many situations, particularly for transactions-based applications such as banking and telemarketing as well as other e-business systems.

The embodiment of the enhanced DASD, as shown in FIG. 2, provides superior RAID-1 data throughput, efficiency, and reliability by mirroring critical data (up to the storage capacity of the microdrive) between the main DASD 12 and the embedded microdrive 14. As a result, the shared system control processor 24 has access to the all data from either disk drive should one of them fail. Hence, the microdrive 14 and main DASD 12 share the data paths, clock speed, single computer interface 28, RAM/ROM EEPROM cache 26, and other electronics of the main DASD 12. Therefore, the enhanced DASD is faster and more reliable than current RAID-1 designs having two independent DASDs connected to a third DASD or controller. These improvements also make the enhanced DASD a much more efficient redundant array if independent disks or RAID device than prior RAID designs by requiring less physical space, less power, less electronics. Therefore, as a RAID system, the invention is quicker, more efficient, and has a greater data throughput, making it more suitable for low-cost e-business semi-dumb PCs with limited DASD storage and performance.

Figure 4:
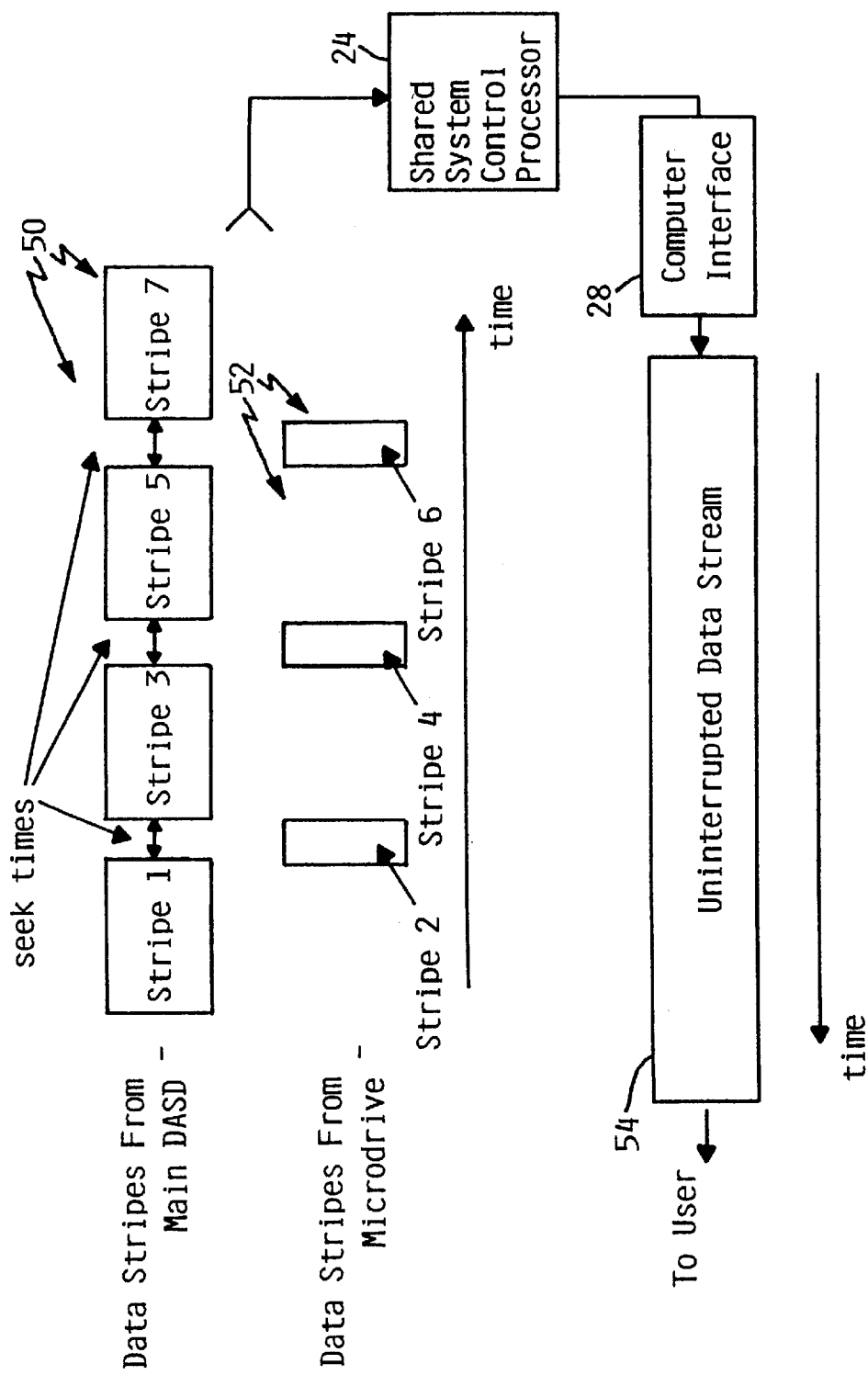
FIG. 4 is a diagram of a data stream example for an enhanced DASD configured as a redundant array of independent disks.

In a RAID-0 system, data is mirrored on two different DASDs so that data can be read in stripes from the main DASD and microdrive. Thus, in addition to the non-volatile advantages of a RAID-1 system, the RAID-0 system can provide an uninterrupted data stream to the user. For instance, as illustrated in FIG. 4, the shared system control processor 24 can access data stripes from the microdrive 52 (stripes 2, 4, and 8), while data stripes from the main DASD 50 (stripes 1, 3, 5, and 7) are unavailable, and vice versa. In this manner, a continuous uninterrupted data stream 54 can be provided at the computer interface 28.

Smaller sized stripes from the microdrive 14 can be used to compensate for the 5 to 10 times larger data rate of a standard main DASD 12. For instance, as shown in FIG. 4, asymmetrically sized data stripes from the main DASD 50 as compared to the data stripes of the microdrive 52, can be used to allow for a more fluid transfer of data. Alternatively, the shared system control processor 24 can adjust the length of stripes read from the main DASD and microdrive, so that the data flow at the computer interface 28 is constant and of optimum speed. As illustrated in FIG. 4, data stripes 52 from the microdrive (stripes 2, 4, and 6) are being read during the seek operation of the main DASD 12, and vice versa. So, if the seek/settle time of the main DASD is 10 milliseconds, data stripes 52 from the microdrive can be supplied to fill in during these seek/settle periods.

Similar to its performance as a superior RAID-1 system, the embodiment of the enhanced DASD shown in FIG. 2, provides superior RAID-0 data throughput, efficiency, and reliability as a result of the embedded microdrive 14. Also, because the main DASD and microdrive share the data paths, clock speed, single computer interface 28, RAM/ ROM EEPROM cache 26, and other electronics of the main DASD 12, the enhanced DASD is also faster and more reliable than current RAID-0 designs because it requires less physical space, less power, less electronics.

Moreover, the enhanced DASD is superior as a general RAID system for other reasons as well. One, it is possible to fabricate an enhanced DASD RAID system with the microdrive 14 mounted or plugged into the main DASD's electronics card or chassis so that it can be easily removed for maintenance and/or replacement. Two, because data is transferred using internal DASD data paths and processor speeds, factors such as arbitration and bus overloading common with SCSI interfaces are not present with an enhanced DASD RAID system. Three, current RAID systems do not share error log data because the logs are not part of the customer data. This means that there is no backup of the error log information for these current RAID DASD's. In fact, many DASDs do not allow access to error log information by a host, thereby precluding any type of backup whatsoever. The enhanced DASD, however, as described above, allows for a non-volatile copy of all disk drive error logs to be kept on each drive. Hence, the risks of non-retrievable error logs associated with current RAID systems does not exist for the enhanced DASD. Finally, by adding numerous microdrives onto a main DASD as described above, it is possible to create higher RAID configurations, thereby multiplying the advantages of the enhanced DASD given here.

Note that it is possible to combine any or all of the configurations and embodiments of the enhanced DASD described above in order to achieve any or all of the benefits as desired.

Other Embodiments

The invention herein can be used as discussed above to enhance performance, functionality, efficiency, and reliability of digital access storage devices including: removable or "floppy" disk drive readers, "backup" Omega or Zip type disk drives, CD ROM drives, DVD drives, and CD recordable drives, and CD re-writeable CD drives.

Certain preferred embodiments have been described above. It is to be understood that a latitude of modification and substitution is intended in the foregoing disclosure, and that these modifications and substitutions are within the literal scope—or are equivalent to—the claims that follow.

Accordingly, it is appropriate that the following claims be construed broadly and in a manner consistent with the spirit and scope of the invention herein described.

I claim:

1. A digital access storage device comprising:
   a first disk drive;
   at least one second disk drive, wherein said second disk drive being smaller than said first disk drive, said second drive having a data transfer rate less than or equal to the data transfer rate of said first drive; and
   an electronic control system interconnecting said first and second disk drives;
   wherein the electronic control system is structured so that the first disk drive and at least one second disk drive function as a redundant array of independent disks; and throughput data of the device comprises stripes of data from both the first and second disk drives;
   wherein the electronic control system comprises a shared system control processor structured to adjust the length of the stripes of data from the first and second disk drives so the throughput data flow of the device is constant.

2. A digital access storage device according to claim 1 wherein the storage device has a system interface and the electronic control system is structured to transfer data between the device interface, the first disk drive, and the second disk drive using the first drive's internal data paths and processor speeds.

3. A digital access storage device according to claim 2 wherein the electronic control system comprises a shared system control processor structured to provide overall control of the first and second disk drives.

4. A digital access storage device according to claim 3 wherein said drives are physically mounted on a common chassis.

5. A digital access storage device according to claim 3 wherein the electronic control system comprises an independent controller for the first disk drive, an independent controller for the second disk drive, and a shared data memory buffer both the first and second disk drives.

6. A digital access storage device according to claim 5 wherein the shared system control processor is structured to control the flow of data between the system interface, the first disk drive, and the second disk drive.

7. A digital access storage device according to claim 1 wherein said drives are physically mounted on a common chassis.

8. A digital access storage device according to claim 7 wherein the electronic control system is structured so that the electronic functionality of the second disk drive is embedded in the electronic functionality of the first disk drive.

9. A digital access storage device according to claim 8 wherein the second disk drive is an embedded memory component of the first disk drive.

10. A digital access storage device according to claim 7 wherein the second disk drive has a capacity of at least 340 Megabytes.

11. A digital access storage device according to claim 1 wherein the second disk drive comprises a microdrive and wherein the electronic control system comprises a compact flash microdrive controller and a compact flash microdrive interface for controlling the second disk drive.

12. A digital access storage device according to claim 1 wherein the first and second disk drives have non-volatile redundant data.

13. A digital access storage device according to claim 1 comprising a non-volatile memory cache on the second disk drive, wherein the electronic control system is structured to control the reading and writing of data from the first disk drive to the non-volatile memory cache on the second disk drive.

14. A digital access storage device according to claim 12 wherein the non-volatile memory cache is comprises a portion of the disk data section of the second disk drive.

15. A digital access storage device according to claim 13 wherein the second disk drive functions as a second-level read and write cache in addition to the first disk drive's regular cache.

16. A digital access storage device according to claim 13 wherein electronic control system is structured to provide read and write data from the non-volatile memory cache on the second drive prior to spin-up of the first disk drive.

17. A digital access storage device according to claim 1 comprising a non-volatile error log on the first disk drive and on the second disk drive.

18. A digital access storage device according to claim 17 wherein the non-volatile error log on the second disk drive is capable of recording a detailed record of errors.

19. A digital access storage device according to claim 17 wherein the non-volatile error log on the second disk drive comprises a copy of the error log for the first disk drive.

20. A digital access storage device according to claim 17 wherein the non-volatile error log on the first disk drive comprises a copy of the error log for the second disk drive.

21. A digital access storage device according to claim 1 wherein the electronic control system is structured to provide parallel access to redundant data on the first disk drive and on the second disk drive.

22. A digital access storage device according to claim 21 comprising a video or/and audio stream playback buffer on the second disk drive.

23. A digital access storage device according to claim 22, wherein the electronic control system is structured so that the first disk drive and at least one second disk drive function as a redundant array of independent disks.

24. A digital access storage device according to claim 1 wherein said stripes are asymmetrical in length.

25. A digital access storage device according to claim 1 wherein the length of a stripe of data from the first disk drive is 5–10 times larger than that of a stripe from the second disk drive.

26. A digital access storage system comprising:
 a first disk drive having a pre-determined size;
 at least one second disk drive, said second disk drive being smaller than the first disk drive, said second drive having a data transfer rate less than or equal to the data transfer rate of said first drive;
 an electronic control system interconnecting said first and second disk drive; and
 wherein said drives are physically mounted on a common chassis;
 wherein the electronic control system is structured so that the first disk drive and at least one second disk drive function as a redundant array of independent disks; and throughput data of the device comprises stripes of data from both the first and second disk drives;
 wherein the electronic control system comprises a shared system control processor structured to adjust the length of the stripes of data from the first and second disk drives so the throughput data flow of the device is constant.

27. A digital access storage device according to claim 26 wherein said common chassis has a standard form factor.

28. A digital access storage device according to claim 26 wherein the chassis (device) fits into the standard form factor disk drive slot.

29. A digital access storage device according to claim 28 wherein the chassis fits into a standard form 3.5" disk drive slot.

30. A digital access storage device according to claim 26 wherein the first disk drive substantially conforms to a first standard form factor, and the second disk drive substantially conforms to a second smaller standard form factor.

31. A digital access storage device according to claim 30 wherein the first disk drive is a traditional 3.5-inch form factor.

32. A digital access storage device according to claim 30 wherein the second disk drive is a 4.28×3.36×0.5-cm form factor.

33. A digital access storage device according to claim 26 comprising a receptacle wherein the second disk drive may be removably plugged.

34. A digital access storage device according to claim 33 wherein the first disk drive comprises an electronic card and wherein said receptacle is located on the electronic card.

35. A digital access storage device according to claim 33 comprising a casting of the first disk drive upon which the second disk drive is mounted.

36. A digital access storage device according to claim 26 comprising a second disk assembly unit comprising the second disk drive and an independent controller for the second disk drive.

37. A digital access storage device according to claim 26 wherein the electronic control system is structured so that the electronic functionality of the second disk drive is physically embedded into the electronic functionality of the first disk drive.

38. A digital access storage device according to claim 26 further comprising a single power supply cable and a single data cable.

39. A method of manufacturing a digital access storage device comprising steps of:
 providing a first disk drive;
 providing at least one second disk drive, said second disk drive being smaller than the first disk drive, said second drive having a data transfer rate less than or equal to the data transfer rate of said first drive; and
 providing an electronic control system interconnecting said first disk drive and said second disk drive;
 wherein the electronic control system is structured so that the first disk drive and at least one second disk drive function as a redundant array of independent disks; and throughput data of the device comprises stripes of data from both the first and second disk drives
 wherein the electronic control system comprises a shared system control processor structured to adjust the length of the stripes of data from the first and second disk drives so the throughput data flow of the device is constant.

40. A method of manufacturing a digital access storage device according to claim 39, comprising the steps of providing a system interface and structuring the electronic control system to transfer data between the interface, the first disk drive, and the second disk drive employing the first drive's internal data paths and processor speeds.

41. A method of manufacturing a digital access storage device according to claim 39 wherein the electronic control system comprises a shared system control processor structured to provide overall control of the first and second disk drives.

42. A method of manufacturing a digital access storage device according to claim 39 comprising the step of physically mounting said drives on a common chassis.

43. A method of manufacturing a digital access storage device according to claim 39 wherein the electronic control system is provided which comprises an independent controller for the first disk drive, an independent controller for the second disk drive, and a shared data memory buffer both the first and second disk drives.

44. A method of manufacturing a digital access storage device according to claim 43 wherein the shared system control processor is structured to control the flow of data between the system interface, the first disk drive, and the second disk drive.

45. A method of manufacturing a digital access storage device according to claim 43 comprising the step of physically mounting said drives on a common chassis.

46. A method of manufacturing a digital access storage device according to claim 43 wherein the electronic control system is selected and structured so that the electronic functionality of the second disk drive is embedded in the electronic functionality of the first disk drive.

47. A method of manufacturing a digital access storage device according to claim 39 wherein the second disk drive is structured to function as an embedded memory component of the first disk drive.

48. A method of manufacturing a digital access storage device according to claim 39 wherein the second disk drive is selected to comprise a microdrive and wherein the electronic control system is structured to comprise a compact flash microdrive controller and a compact flash microdrive interface for controlling the second disk drive.

49. A digital access storage device comprising:

a first disk drive;

at least one second disk drive, wherein said second disk drive being smaller than said first disk drive, said second drive having a data transfer rate less than or equal to the data transfer rate of said first drive; and an electronic control system interconnecting said first and second disk drives;

wherein the electronic control system is structured so that the first disk drive and at least one second disk drive function as a redundant array of independent disks; and throughput data of the device comprises stripes of data from both the first and second disk drives;

wherein the electronic control system comprises a shared system control processor structured to adjust the length of the stripes of data from the first and second disk drives so the throughput data flow of the device is constant;

wherein the shared system control processor is structured so that the second disk drive provides throughput data during the seek operation of the first disk drive.

50. A digital access storage system comprising:

a first disk drive having a pre-determined size;

at least one second disk drive, said second disk drive being smaller than the first disk drive, said second drive having a data transfer rate less than or equal to the data transfer rate of said first drive;

an electronic control system interconnecting said first and second disk drive; and wherein said drives are physically mounted on a common chassis;

wherein the electronic control system is structured so that the first disk drive and at least one second disk drive function as a redundant array of independent disks; and throughput data of the device comprises stripes of data from both the first and second disk drives;

wherein the electronic control system comprises a shared system control processor structured to adjust the length of the stripes of data from the first and second disk drives so the throughput data flow of the device is constant;

wherein the shared system control processor is structured so that the second disk drive provides throughput data during the seek operation of the first disk drive.

51. A method of manufacturing a digital access storage device comprising steps of:

providing a first disk drive;

providing at least one second disk drive, said second disk drive being smaller than the first disk drive, said second drive having a data transfer rate less than or equal to the data transfer rate of said first drive; and providing an electronic control system interconnecting said first disk drive and said second disk drive;

wherein the electronic control system is structured so that the first disk drive and at least one second disk drive function as a redundant array of independent disks; and throughput data of the device comprises stripes of data from both the first and second disk drives;

wherein the electronic control system comprises a shared system control processor structured to adjust the length of the stripes of data from the first and second disk drives so the throughput data flow of the device is constant;

wherein the shared system control processor is structured so that the second disk drive provides throughput data during the seek operation of the first disk drive.

* * * * *